United States Patent [19]

Irving et al.

[11] 4,392,315

[45] Jul. 12, 1983

[54] DESTRUCTION AND DYE RESISTANT TAG; TAGGED TEXTILE ARTICLE AND METHOD OF IDENTIFYING TEXTILES SUBJECT TO A DYEING AND FINISHING PROCESS

[75] Inventors: William A. Irving; Robert E. Thornton, Jr., both of Knoxville, Tenn.

[73] Assignee: Standard Knitting Mills, Inc.

[21] Appl. No.: 338,960

[22] Filed: Jan. 12, 1982

[51] Int. Cl.[3] .......... G09F 3/02; B32B 27/06; B32B 27/34; D21D 3/00

[52] U.S. Cl. .......... 40/27; 40/2 R; 8/924; 8/925; 428/474.7; 162/132

[58] Field of Search .......... 40/2 R, 309, 27; 493/461; 8/925, 924; 162/157 R, 146, 164 R, 132; 428/474.9, 474.4, 474.7; 229/DIG. 5

[56] References Cited

U.S. PATENT DOCUMENTS

| | | | |
|---|---|---|---|
| 1,447,555 | 3/1923 | Kamijo | 40/2 R |
| 2,546,012 | 3/1951 | Owen | 129/16.1 |
| 2,988,782 | 6/1961 | Parrish | 18/48 |
| 2,999,788 | 9/1961 | Morgan | 162/146 |
| 3,013,936 | 12/1961 | Iyengar | 162/157 |
| 3,062,702 | 11/1962 | Parrish | 162/157 |
| 3,282,038 | 11/1966 | Howell | 57/155 |
| 3,384,535 | 5/1968 | Marek | 162/157 |
| 3,489,643 | 1/1970 | Hoffman | 162/146 |
| 3,549,789 | 12/1970 | Haroldson | 174/122 |
| 3,595,739 | 7/1971 | Meyer | 40/2 R |
| 3,695,992 | 10/1972 | Moulds | 428/474.4 |
| 3,727,826 | 4/1973 | Shepherd | 229/DIG. 5 |
| 3,756,908 | 9/1973 | Gross | 162/146 |
| 3,757,936 | 9/1973 | Lindegren | 206/56 |
| 3,819,569 | 6/1974 | Baird | 260/45 |
| 3,828,454 | 8/1974 | Hafner et al. | 40/27 |
| 3,947,983 | 4/1976 | Brunette | 40/27 |
| 3,995,808 | 12/1976 | Kehoe | 229/DIG. 5 |
| 4,091,058 | 5/1978 | Sander | 264/11 |
| 4,097,645 | 6/1978 | Toyoda et al. | 428/474.7 |
| 4,098,640 | 7/1978 | Sander | 162/146 |
| 4,107,861 | 8/1978 | Johnson | 40/2 R |
| 4,187,143 | 2/1980 | Sander | 162/157 |
| 4,204,639 | 5/1980 | Barber et al. | 40/2 R |
| 4,211,021 | 7/1980 | Amprim et al. | 40/2 R |
| 4,284,196 | 8/1981 | Lagerkvist | 229/DIG. 5 |

OTHER PUBLICATIONS

DuPont Bulletin NX-6, Jun. 1977–Properties and Performance of NOMEX M Aramid and Mica Paper Type 418.

DuPont Bulletin NX-7, Nov. 1977–Properties and Performance of NOMEX Type 410 Aramid Paper.

DuPont Bulletin NX-5, Dec. 1976–Properties and Performance of NOMEX Aramid Paper Type 411.

DuPont Bulletin NX-4, Nov. 1976–Properties of NOMEX Type 414 Aramid Paper.

*Primary Examiner*—Gene Mancene
*Assistant Examiner*—Michael J. Foycik
*Attorney, Agent, or Firm*—Kerkam, Stowell, Kondracki & Clarke

[57] ABSTRACT

An article and method for tagging textile units by attaching a destruction and dye resistant tag formed of at least one ply of aramid paper marked with color-contrast indicia including information on a characteristic of the textile unit or process to which the tag is subjected. The aramid paper consists essentially of a nonwoven, nonfused commingled mixture of floc of a nonfusable aromatic polyamide and fibrids of a nonfusable aromatic polyamide and is sufficiently dye and abrasion resistant so that the indicia are readable after the tag is exposed to harsh dyes, bleaches, high temperatures, and pressures. The tag may be affixed by sewing or clipping or may include a pressure sensitive surface. Multiple plies may be laminated in cross directions to increase tear strength.

29 Claims, 3 Drawing Figures

DESTRUCTION AND DYE RESISTANT TAG; TAGGED TEXTILE ARTICLE AND METHOD OF IDENTIFYING TEXTILES SUBJECT TO A DYEING AND FINISHING PROCESS

BACKGROUND OF THE INVENTION

1. Field of the Invention

This invention relates to the use of destruction and dye resistant tags, for tagging and identifying textiles subject to a dyeing and finishing process. More specifically, this invention relates to the use of an aramid paper as a tag.

2. Description of the Prior Art

In the textile industry it is common and necessary practice to identify textile units (rolls, bolts, etc.) which are subject to a dyeing process. Specifically, it is useful to tag units and to include on the tags information as to a characteristic of the tagged textile unit or the process to which the textile unit is subjected. However, the passage of the unit through a dyeing stage and/or bleaching stage will usually destroy any information recorded on a ticket or tag attached to the unit. On one hand, the tag may absorb dye and discolor to such an extent that the information previously recorded thereon is no longer distinguishable. On the other hand, the tag may be bleached so that the information recorded thereon is no longer visible. Still another problem is that the tag may be torn, or otherwise destroyed due to heating, tumbling or chemical reaction.

Several methods have heretofore been used in the textile industry to identify textile units to counteract the aforenoted problems. These include:

(1) Isolation of textile units into separate dye lots where the identifying document and associated information is physically removed from the textile unit(s) during dyeing, but kept associated with the unit(s) until the material has been dried and finished. This method, which requires keeping the identifying document separate from the textile unit, is generally unsatisfactory except for small batch processing where it is relatively easy to keep track of which identifying document is associated with a particular textile unit.

(2) Attaching a removable ticket to each unit while stencilling a unit identification number with either a light ink (on dark shades) or a dark ink (on light shades) by hand on the textile unit. In this method the regular identification ticket marked with textile information and the unit I.D. number is removed prior to the dyeing and/or bleaching. After the textile unit is dry and processing complete, the ticket may be matched up to the textile unit by the identification number and the ticket is sewn or otherwise reattached to the textile unit. Additionally, depending upon the color and shade of dye which is being used, it may be necessary to use a different color ink for stencilling.

(3) Tagging with a numbered metal tag. In this method the regular identifying ticket is removed and the number of the metal tag is recorded on the ticket. The metal tag is then attached to the textile unit which is then processed. When the material is dry after the bleaching and/or dyeing process is complete, the identifying ticket is reattached by matching the number on the metal tag attached to the textile unit to the identifying ticket.

The use of various tags for various purposes is disclosed in the following U.S. Patents:

| Number | Inventor(s) | Issue Date |
|---|---|---|
| 3,828,454 | Hafner et al | August 13, 1974 |
| 3,947,983 | Brunette | April 6, 1976 |
| 4,107,861 | Johnson | August 22, 1978 |

As disclosed at column 1 of the Hafner et al patent, numerous attempts have been made over the years to develop a tag suitable for use in harsh conditions and to alleviate the problem of illegible tags. The tag proposed by the Hafner et al patent includes a metal sheet laminated to cross-woven fiberglass sheets.

The Brunette patent discloses a chemical process resistant tag structure comprising a foil layer laminated to a web of spun polyethylene fibers. The tag is suggested to be suitable for use with textiles processed through hot dyeing vats by virtue of the resistance of the foil on one side and the plastic material on the other side to fluid absorption.

The Johnson patent disclosed a label structure having a sheet member or oriented thermal plastic polymer bonded to a substrate member. The tag structure is disclosed as being resistant to temperature changes and chemicals which do not attack the label structure. The sheet of oriented thermal plastic polymers may be composed of polyamide polymers or rubber-modified polyethylene polymer, among other materials.

Thus, it has generally been recognized that plastic and metal tags are useful as tags in identifying textiles being processed through various treatment stages such as dyeing, bleaching, finishing, etc. where the textile and associated tag may be subject to harsh and caustic chemicals, mechanical handling and temperature changes. However, there is a well recognized need for tags which can be imprinted with indicia which remain relatively unaffected by the treatment process so that the units can be conveniently tagged prior to treatment without fear of having the tag either destroyed or the indicia rendered illegible during the process.

In addition to the recent developments in tag structure design as discussed above, there has been recent activity devoted towards the quite divergent goal of realizing an electrical insulation material suitable for use at high temperatures. For example, U.S. Pat. No. 3,756,908, of George C. Gross, patented Sept. 4, 1973, and hereby incorporated by reference, discloses an aramid paper suitable for use as an electrical insulator. The paper consists essentially of a non-woven, nonfused, commingled mixture of floc (short length fibers) of a nonfusable aromatic polyamide and fibrids (small binder particles) of a nonfusable aromatic polyamide. The floc and fibrids are slurried together as a mix which may be converted to appear on a Fourdorinier machine or other conventional paper making process. Characteristics of aramid papers include good thermal stability and high electrical resistance, thus making it readily acceptable for use as an electrical insulating tape. But its use outside of the electrical industry is relatively limited because the aramid paper has a great reluctance to accept dye. Indeed, various attempts have been made to overcome this limitation to find other uses for this material.

More generally, the preparation of fibrids of various polymers and their use in making synthetic papers is described in Morgan U.S. Pat. No. 2,999,788, issued Sept. 12, 1961, hereby incorporated by reference. The Morgan patent discloses fibrid bonded paper like products as having a broad range of applications and sheet products prepared from hard polymers fibrids or combinations of these fibrids and hard polymer staple may provide good dimensional stability, resistance to alkity, low water absorption, good wet strength and low moisture sensitivity.

OBJECTS

Accordingly, it is an object of the present invention to provide a method and article for tagging of textile units wherein the textile unit tag may remain on the textile unit through the entire textile treatment process.

A further object of the present invention is to provide a textile unit tag or ticket which is simple in structure and which has good dimensional stability, resistant to alkalis and harsh and caustic chemicals, low water absorption and good wet strength.

Notwithstanding the recognized characteristics of synthetic papers such as disclosed in the Morgan patent, the poor dye acceptability characteristic or aramid papers has essentially restricted its use as in the electrical industry as a conductor, insulator and coil wrap.

We have found that aramid papers can be readily adapted as tags or tickets for textiles subject to a dyeing and finishing process and are not objectionally adversely affected by dyes, chemicals, temperature and handling and are capable of retaining premarked indicia which remains legible and readable through all stages of the textile dyeing and finishing process.

Yet another object of the present invention is to provide an improved tag or ticket suitable for use as an article identifier at high temperatures, high pressures and otherwise harsh environmental process treatment conditions.

A still further object of the present invention is to provide a tag or ticket as an article identifier which has good dimensional stability and will hold up under the abrasion and agitation involved in a treatment process.

Yet another object of the present invention is to provide an improved tag or ticket having information imprinted thereon which information is machine readable even after passage of the article and associated tag through a dyeing and chemical treatment process.

A still further object of the present invention is to provide a new use for aramid paper.

SUMMARY OF THE INVENTION

These and other objects of the present invention, which will become apparent as the description proceeds are realized by a process of identifying textile or other units subject to a dyeing or other chemical treatment which includes a new use for aramid papers. In accordance with the present invention, a tag comprising dye-resistant aramid paper is attached to the unit whose identification is to be maintained. Color-contrast indicia are placed on the aramid paper to identify the unit. The units with the tag attached are then subject to a conventional treatment process which may include dyeing, bleaching, drying and/or other chemical treatment steps. The color-contrast indicia remain visible after completion of the process. Preferably, at least some of the color-contrast indicia are marked in a machine readable arrangement and, because of the dye resistant quality of the aramid paper, these indicia remain machine readable even after the dyeing step. The tags or tickets are cut from an aramid paper sheet or roll which preferably consists essentially of a nonwoven, nonfused commingled mixture of floc of a nonfusable aromatic polyamide and fibrids of a nonfusable aromatic polyamide, density greater than 0.6 gm/cm$^3$, and a thickness between approximately 2 mils to 15 mils.

The present invention is also embodied in tags or tickets made from an aramid paper and a textile unit having a tag attached thereto, the tag including color-contrast indicia marked on the aramid paper. Preferably, at least some of the indicia are marked in a machine readable arrangement and include information on a characteristic of the textile unit and/or a textile process. The aramid paper is preferably a calendered paper consisting essentially of a nonwoven, nonfused commingled mixture of floc of a nonfusable aromatic polyamide and fibrids of a nonfusable aromatic polyamide. The aramid paper preferably has a density greater than 0.6 gm/cm$^3$ and a thickness of from 2 mils through 15 mils.

DETAILED DESCRIPTION OF THE PRESENT INVENTION

The present invention is implemented by the use of a tag comprising dye-resistant aramid paper. As used herein, "paper" refers to a thin, flexible material made in sheets from a slurry of fibrous material, which sheets may be individual or continuous and rolled for ease of storage and handling. "Aramid" as used herein shall refer to nylon-type polymers based upon aromatic polyamides. Such aromatic polyamides are generally prepared from aromatic polyamines and polybaric acids as opposed to typically aliphatic polyamides which make up most of the so-called "nylons".

While the tags of the present invention are useful in identifying all forms of articles which may be subject to batch chemical treatment processes and where it is desirable to maintain identification of the articles throughout the process, the invention will be described in terms of its application to identification of textile units in a textile treatment process.

A tag comprising dye resistant aramid paper is used for each individual roll of cloth or other textile unit. As used herein, "textile unit" shall include rolls, bolts, or other units of cloth of fabric and including, among other things, woven, knitted, pressed, tufted structures of fibrous material whether made of cotton, wool, silk, synthetic fibers, or other materials.

Figure 1:
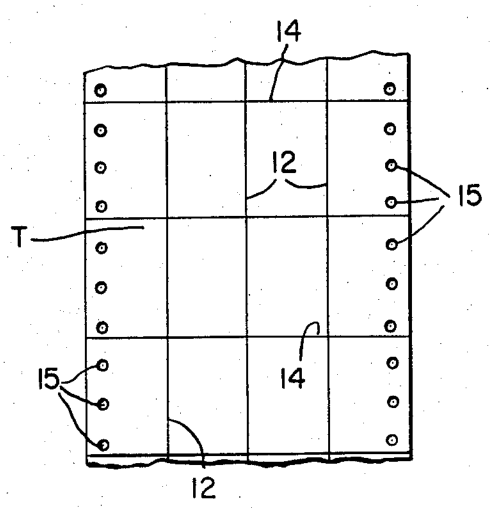
FIG. 1 is a fragmentary view of a single ply aramid paper, scored and punched with line holes.
Figure 2:
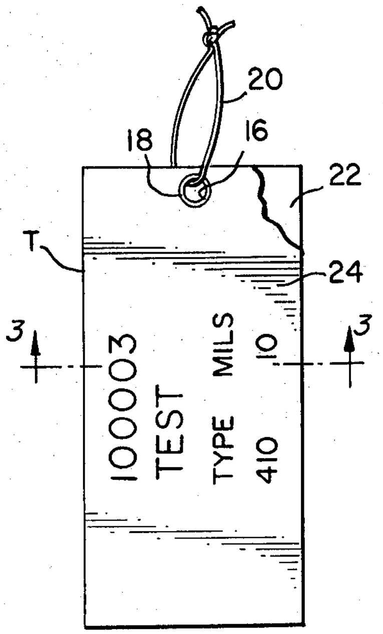
FIG. 2 depicts a tag made in accordance with the present invention.
Figure 3:
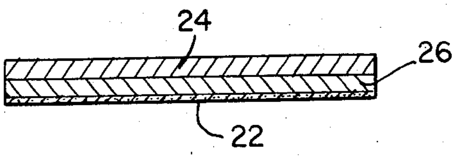
FIG. 3 is an alternate embodiment showing a laminated tag structure, in cross section, taken along lines 3—3 of FIG. 2.

Referring to the drawings, there is illustrated in FIGS. 1-3 a physical embodiment of the invention. FIG. 1 shows a fragmentary view of a single sheet of aramid paper 10, having score lines 12 running the vertical length and score lines 14 running transverse thereto. The single sheet 10 is of single ply material and is thus readily adapted to form a plurality of tags T, each individual tag being marked with suitable indicia, as shown in FIG. 2. To this end, at least one side and preferably both sides of the paper 10 are punched to provide line holes 15 to facilitate printing. If desired, each tag may be provided with an aperture 16 and a reinforcing eyelet 18 through which is passed a wire 20 used for attaching the tag to the article to be passed through the dyeing process. Alternatively, the tag may have a pressure sensitive adhesive 22 applied to one exposed surface as shown, for example, in FIG. 3. FIG. 3 shows an alternative embodiment wherein tag T is formed of at least two plies 24 and 26 of aramid paper which preferably have their MD directions arranged perpendicular to each other. The two layers 24, 26 are laminated to each other by a suitable commercial adhesive placed therebetween. As shown in the figures, the indicia are applied directly to a surface of the aramid paper without any coating in between the indicia and the aramid paper. As further shown, there is no coating over the indicia and this uncoated surface will thus be exposed to the chemical treatment process.

The Tagging Method

As an example, the use of the tag of the present invention for identifying an individual roll of cloth will presently be discussed. Preferably, a tag to be used to identify an individual roll of clutch is printed with indicia corresponding to information about a characteristic or characteristics of the particular roll (e.g., type of fabric, type of weave, an identification number, etc.) and/or information relative to a textile process (e.g., what type of dyeing process will be used, temperature or pressure conditions to which the roll of cloth will be subject, etc.) Although the indicia or information on a characteristic of the roll of cloth and/or a textile process may be written by hand, it is preferred that this information be machine printed. To facilitate the machine printing of this information, the aramid paper may be in rolled form having a series of line holes along one or both edges to allow passage of the sheet through a computer printer.

The sheets may, for example, be approximately twelve (12) inches in width and prescored to form rectangular tags of two (2) inches by four (4) inches. Tags of other sizes may be formed. The line holes are standard in automated printing operations and are shown, for example, in the above-identified Brunette patent which is also prescored along the width at spaced intervals to allow an upper ply to be separated. Regardless of whether the information is printed, written, or otherwise marked on the aramid paper of the tag, the information is placed on preselected areas of the paper as it is unwound from the roll and is represented by a color-contrast indicia, meaning that there is a difference in color between the portion of aramid paper having a particular indicium marked thereon and the adjacent unmarked aramid paper. The color-contrast indicia may include ordinary alpha-numeric characters, coded characters or other forms of machine-readable coding such as, for example, the uniform product code commonly used with optical reading devices, or a mixture thereof.

Various types of information may be included on the tag. For example, each tag may include instructions on how greige yarn is to be knit and otherwise processed. Accordingly, a knitting technician may take the tags of aramid paper grouped by like kind and set up a knitting process. A process operator then separates the tagged knit fabric which may be rolled in accordance to the process by which they are to be treated. The tag may be sewn, adhered, or otherwise attached to the corresponding roll of cloth. If desired, the number identifying the process station and/or operator may be added to the tag as by laundry marker pens or punching as the unit is passed through the processing station. Alternately, such information could be preprinted with the tag or added by a printer after the tag is attached to the roll of cloth. Indeed, blank tags could be attached to the roll of cloth and the marking of the tag could be done after the attachment, although the use of preprinted tags is preferred. If, as is typical in the industry, the roll of cloth is then weighed, the weight may be recorded on the tag. As should be apparent, the tag is capable of having recorded thereon a variety of data identifying the material as it is processed through various operating stages. In continuation of the treatment process, after knitting the fabric, the roll of cloth with its individual aramid paper tag is then sent to the cloth room where it is assembled with other rolls of the same kind into run-/order numbers (corresponding to dye lots). The run number information may be added to the tag, after which the roll of fabric and attached tag is passed through a dyeing and/or bleaching process.

Unlike the prior art approaches, there is no necessity for removing the tag during processing of the fabric and the tag may be passed through the dyeing, bleaching or other finishing process, together with the roll of fabric. The color-contrast indicia on the tag remains intact and distinguishable due to the dye-resistant nature of the aramid paper and retains its initial character substantially due its dimensional stability and heat and water resistant character.

Dye/Bleach Process Conditions

Although the specifics of the dye or bleach process will, of course, be dependent upon the type and form of material being processed, it is useful to discuss various conditions which are often encountered. The extremes in these conditions should be fully appreciated in considering the long felt need for a suitable tag identifier which can be carried through various process stages without being destroyed or losing the information imprinted thereon. This need is met by the tag of the present invention.

Conditions encountered in the dye process include temperatures of 370° F. (wet heat) in the presence of a carrier (a pre-treatment causing most fibers to swell and trap dye pigments) at pressure 260 PSI. Bleaching and dyeing operations involve pH ranges from 4.5 to 12.5 (mildly acidic to strongly akaline). The tag of the present invention in addition to being exposed to these conditions may be subject to constant abrasion and agitation for up to twelve hours and still retains its original identity and indicia in readily recognizable form.

Following the dye process, the roll of fabric and attached tag may be subjected to other chemical treating agents, such as softeners, starches, etc. and thereafter dried. Dryers generally operate at temperatures near 360° F. (dry heat) with exposure times of several minutes.

At this point in the processing of the roll of fabric or other textile unit, some styles of fabrics may get special mechanical treatments, such as shearing, laminating, or napping. These mechanical treatments may be carried out without directly exposing the tag of aramid paper to the treatments.

Finally, many fabrics are heated under tension on tenter frames to hold their shape and remove wrinkles. The temperatures may exceed 400° F., although exposure times are usually short.

A more specific example of an illustrative process to which a roll of cloth and attached tag of aramid fiber of the present invention might be subjected to would include the following in outline form:

1. Dye tubs
   A. Open becks at atmospheric pressure
      (1) Time: 6 hrs.—19 hrs.
      (2) PH: 3.5–10
      (3) Temperature: 90°–212° wet heat (90 min. at top limit)
   B. Pressure jets
      (1) Time: 6 hrs.–8 hrs.
      (2) PH: 3.5–10
      (3) Temperature: 90°–265° wet heat (90 min. at top limit)
   C. In Dye Tubs Cloth Is Subject To
      (1) Abrasion from constant tumbling
      (2) Dye carrier—chlorinated toluene, bi-phenyl for polyester dying—PH 5.5—9.0 at 212° F. atmospheric or 265° under pressure (90 min. at top limit)
2. Tri pad (Wet process)
   A. Time: 600#/hr. (Avg) or 44 yds/min (Avg)
   B. Temperature
      (1) 110° F.
      (2) One (1) tripad has a steam box with super heated steam (340° F.)
   C. Finishes
      (1) Softeners
      (2) PVA to control curling
   D. Time at temperature in seconds
3. Dryers
   A. Time: 600#/hr. (Avg)
   B. Temperature: 325° F. dry heat/1.5 min.—15 min.
4. Napper
   A. Cloth being napped (i.e. Sweat shirts—fleeced)
   B. 365#/hr. (Avg)
5. Turn and/or dry fold (either fold or Paknit)
   A. Turn—reverse inside out
   B. Dry fold
      (1) Time: 450#/hr. (Avg)
      (2) Temperature: 340° F. Steam heat
   C. Paknit
      (1) Time: 536#/hr.
      (2) Hot Roller 300° F.
      (3) Steam 340° F.
      (4) Time at temperature in seconds The tag of the present invention is made of aramid paper. In particular, the aramid paper is produced from short length fibers called floc and small binder particles called fibrids of high temperature resistant aramid polymer. The floc and fibrids are formed into a sheet structure on a Fourdriner paper machine without the necessity of using additional binders, fillers, or sizes. The product of the Fourdriner machine is then calendered with heat and pressure to increase its density to a bulk specific gravity of 0.6 to 1.2 depending on its thickness. The ideal thickness for use as a tag may depend upon the particulars of the dyeing process to which the tag will be subjected. Preferably the aramid paper has a density greater than 0.6 gm/cm$^3$ and a thickness between 2 mils to 15 mils.

Suitable aramid papers which may be utilized to form tags are commercially available from the Dupont Company and sold under the brand name Nomex (a trademark of Dupont). In particular, Nomex type 410 and type 414 aramid papers have been found especially suitable for use as the tag of the present invention. Nomex type 411 aramid paper and Nomex type 418M aramid and mica paper may also be used as textile tags. However, types 411 and 418 are disadvantageous in that they have a tendency to easily tear upon abrasion which may make them unacceptable for identifying units subject to tumbling either in the dye tubs or the drying stage of specific dyeing processes.

The following chart, based upon information in Dupont bulletin NX-7, November 1977, titled "Properties and Performance of Nomex Type 410 Aramid Paper", bulletin NX-5, December 1976, entitled "Properties and Performance of Nomex Aramid Paper Type 411", Dupont bulletin NX-4, November 1976, entitled "Properties of Nomex Type 414 Aramid Paper", and Dupont bulletin NX-6, June 1977 entitled "Properties and Performance of Nomex M Aramid and Mica Paper Type 418," summarizes relevant properties of the Nomex brand aramid papers. The Dupont bulletins mentioned above are hereby incorporated by reference and copies thereof are attached hereto as a supplemental prior art record to be maintained in the application file.

TABLE I

PROPERTIES OF ARAMID PAPERS

| NOMEX | thickness mils | thickness mm | basis wt. g/m$^2$ | density g/(cm)$^3$ | tensile strength MD N/cm | tensile strength XD N/cm | calendered? yes/no | Finch tear MD N | Finch tear XD N |
|---|---|---|---|---|---|---|---|---|---|
| Type 410 | 2 | 0.05 | 40 | 0.8 | 37 | 21 | yes | 85 | 49 |
| | 5 | 0.13 | 110 | 0.8 | 130 | 77 | yes | 350 | 180 |
| | 10 | 0.25 | 240 | 1.0 | 300 | 190 | yes | 710 | 320 |
| | 15 | 0.38 | 370 | 1.0 | 460 | 320 | yes | 710 | 380 |
| Type 411 | 5 | 0.13 | 41 | 0.3 | 17 | 9 | no | 45 | 27 |
| | 10 | 0.25 | 78 | 0.3 | 35 | 21 | no | 100 | 62 |
| | 15 | 0.38 | 130 | 0.3 | 56 | 35 | no | 180 | 120 |
| Type 414 | 7 | 0.18 | 170 | 0.9 | 147 | 89 | yes | 489 | 245 |
| | 10 | 0.25 | 248 | 1.0 | 235 | 130 | yes | 801 | 365 |
| | 15 | 0.38 | 387 | 1.0 | 364 | 228 | yes | 1157 | 698 |
| Type 418 | 5 | 0.13 | 150 | 1.2 | 60 | 40 | yes | 58 | 36 |
| | 10 | 0.25 | 290 | 1.2 | 120 | 187 | yes | 110 | 67 |

Each of the four types of paper have been tested with types 410 and 414, 10 or 15 mils thickness showing superior results over the others.

As is shown in Table I, the density of Type 411 paper is significantly lower than other papers. Also, type 411 paper is the only one of the four listed papers which is uncalendered. The acceptability of type 411 paper as opposed to the others was found to be restricted to less abrasive and less harsh dyeing processes due to its tendency to tear. Accordingly, it is preferable to use a calendered aramid paper and, in particular, a calendered paper having a density of at least 0.8 gm/cm$^3$. The Finch tear characteristics given in the Table indicate that type 411 and type 418 papers have significantly less resistance to tearing than the type 410 and type 414 papers. For any particular type of paper, the Finch tear characteristics will, of course, be partly dependent upon the thickness of the paper. Judging from the results of tests which have been run on the various types of paper, it is much preferred to have a tag made of aramid paper having Finch tear characteristics of higher than 100 in the MD (machine direction of the paper) and 60 in the XD (cross direction of paper). Although this will exclude some thin type 410 paper, particularly in an abrasive process, the thicker papers with higher Finch tear characteristics have been found to hold up best under abrasion and preferably the tag should have a Finch MD rating of at least 300 and a Finch XD rating of at least 180.

The 10 mil thickness of Types 410 and 414 papers have been found to be well adapted towards the use as a textile identification tag over a variety of process conditions. However, the particulars of a dyeing process may make other aramid papers more suitable on occasion.

The printing on the aramid paper tag may be accomplished by use of a matrix printer. Upon printing of the color-contrast indicia on the aramid paper, the information on the tag may be read and checked either by a person or a machine due to the contrast between the black or dark blue ink of the indicia and the generally white or beige color of the aramid paper. It has been found that even after passing a printed tag through a double navy dye process, the indicia remains legible due to the dye resistant characteristics of the aramid paper.

A matrix printer has been found to be especially suitable for printing the color-contrast indicia on the aramid paper tag of the present invention. In particular, the use of a Printronix 300 matrix printer and ink No. 79 from Columbia Great Lakes Company have been found to be suitable in implementing the present invention. The ink No. 79 is smear-resistant and high temperature resistant. The high temperature resistance characteristic of the ink is necessary because of the high temperatures to which the textile tag is subject. The smear-resistance characteristic resists smearing which might otherwise occur upon abrasion and other adverse conditions typical of a fabric treatment process.

The use of a matrix printer is highly advantageous in that it allows alpha-numeric characters or other indicia to be printed in large sizes to enhance retention of their visibility and definition after the textile units have undergone the treatment process. Further, a matrix printer allows one to adjust the printer to provide more ink in a given area of the tag surface, thereby ensuring that sufficient ink is applied to the tag to withstand the abrasiveness in the dyeing process. The matrix printer may print machine readable indicia for reading by an optical cursor or the like.

Preferably, the tag of the present invention will include the printed information on one side of the tag, whereas additional information may be added manually by use of laundry pens on the other side of the tag to insert specific data during the treatment process as the need arises.

Several variations to the tag may be made. For example, one side of the tag may include a pressure sensitive heat and water resistant adhesive enabling the tag to be secured to the particular roll of cloth by pressure. Otherwise, the tag may be wired, sewn or stapled to a textile unit. To this end, a reinforced aperture may be provided adjacent one end.

Although the preferred tag structure embodies a single ply of aramid paper, a modification of the present invention would use a laminated structure having multiple plys adhered together or a single layer of aramid paper forming one surface of the tag and a backing layer of reinforcement material on the other surface of the tag. As an example, the backing layer may be aramid paper having a machine direction perpendicular to the aramid paper of the other layer. The use of such a backing layer advantageously minimizes the chances of the tag tearing in its MD machine direction.

Although various details of the preferred embodiments and methods of the present invention have been discussed heretofore, it is to be appreciated that these details are for illustrative purposes only. Various modifications and adaptations will be readily apparent to those of skill in the art. Accordingly, the scope of the present invention should be determined by reference to the appended claims which are intended to cover the true spirit of the invention.

What is claimed is:

1. A method of identifying textile units subject to a chemical treatment process including dyeing of the unit comprising:

(a) applying color-contrast indicia directly onto an aramid paper layer of an abrasion and dye resistant tag, (b) attaching the tag to a textile unit, the (c) subjecting said textile unit with said tag attached to the chemical treatment process for dyeing and treating said unit, said color-contrast indicia remaining visible after completion of said process and wherein said aramid paper layer consists essentially of a nonwoven, nonfused commingled mixture of floc of a nonfusable aromatic polyamide and fibrids of a nonfusable aromatic polyamide.

2. The method of claim 1 wherein at least some of said color-contrast indicia are applied in a machine-readable arrangement.

3. The method of claim 1 wherein said paper is a calendered paper.

4. The method of claim 3 wherein said color-contrast indicia is ink applied to an uncoated surface of said aramid paper layer, and said uncoated surface is exposed to the chemical treatment process.

5. The method of claim 4 wherein said paper has a density of at least 0.6 $gm/cm^3$ or greater.

6. The method of claim 4 wherein said paper has a thickness between 2 mils and 15 mils.

7. The method of claim 1 wherein said color-contrast indicia includes information on a characteristic of said textile unit and/or the textile process to which the unit is subjected.

8. An article comprising a textile unit, a destruction resistant and dye-resistant tag attached to said textile unit, said tag comprising at least one ply of aramid paper and having color-contrast indicia directly on said at least one ply of aramid paper, and wherein said at least one ply of aramid paper consists essentially of a nonwoven, nonfused commingled mixture of floc of a nonfusable aromatic polyamide and fibrids of a nonfusable aromatic polyamide.

9. The article of claim 8 wherein at least some of said color-contrast indicia are in machine-readable form.

10. The article of claim 8 wherein said aramid paper is a calendered paper.

11. The article of claim 10 wherein said color-contrast indicia is ink applied to an uncoated surface of said aramid paper layer, and said tag is sufficiently dye resistant that said ink remains legible even after said uncoated surface is exposed to the chemical treatment process.

12. The article of claim 11 wherein said aramid paper has a density of at least 0.8 gm/cm$^3$.

13. The article of claim 11 wherein said aramid paper has a thickness between 2 mils and 15 mils.

14. The article of claim 8 wherein said color-contrast indicia includes information on a characteristic of said textile unit and/or a chemical process to which the unit is subjected.

15. The article of claim 8 wherein said aramid paper has a Finch tear characteristic greater than 100 for its machine direction (MD) and 60 for its cross direction (XD).

16. The article of claim 8 wherein the Finch Tear characteristic of the aramid paper is at least 300 in the MD direction and at least 180 in the XD direction.

17. The article of claim 16 wherein the thickness of the ply is between 2 mils and 15 mils.

18. The article of claim 17 wherein the density of the aramid paper is at least 0.6 gm/cm$^3$.

19. The article of claim 8 wherein the tag comprises at least two layers forming a laminated tag, each layer comprising a ply of aramid paper.

20. The article of claim 19 wherein the layers are arranged with their MD perpendicular to each other.

21. The article of claim 8 wherein one side of the paper includes a pressure sensitive adhesive.

22. A tag for identification of articles subject to a chemical process including dyeing and/or finishing of the article comprising at least one ply of aramid paper, said paper having color-contrast indicia directly thereon identifying a characteristic of the article and/or the process to which the article is subject, said paper being sufficiently dye resistant and abrasion resistant so that the indicia remains legible after completion of the process, and wherein said at least one ply of aramid paper consists essentially of a nonwoven, nonfused commingled mixture of floc of a nonfusable aromatic polyamide and fibrids of a nonfusable aromatic polyamide.

23. A tag as set forth in claim 22 having one surface including a pressure sensitive adhesive.

24. A tag as set forth in claim 22 including at least two plys of aramid paper laminated together, the indicia being on at least one exposed surface of the lamination.

25. A tag as set forth in claim 24 wherein each said plys have a tensile strength greater in the machine direction (MD) than in the cross direction (XD), the plys being laminated with the machine direction (MD) of one ply being perpendicular to the machine direction (MD) of the other ply.

26. A tag as set forth in claim 22 wherein said ply has a density of at least 0.8 gm/cm$^3$.

27. The tag as set forth in claim 22 wherein the thickness of the ply is between 2 mils and 15 mils.

28. The tag as set forth in claim 22 wherein the ply has a Finch tear characteristic greater than 100 in its machine direction (MD) and greater than 60 in its cross direction (XD).

29. The tag as set forth in claim 28 wherein the Finch tear characteristic is at least 300 in the MD direction and at least 180 in the XD direction.

* * * * *

UNITED STATES PATENT AND TRADEMARK OFFICE

CERTIFICATE OF CORRECTION

PATENT NO. : 4,392,315

DATED : July 12, 1983

INVENTOR(S) : William A. Irving and Robert E. Thornton, Jr.

It is certified that error appears in the above-identified patent and that said Letters Patent are hereby corrected as shown below:

In claim 1, column 10, line 28, the second "the" should be deleted and the word --and-- inserted in its place

Signed and Sealed this

*Thirteenth* Day of *September 1983*

[SEAL]

*Attest:*

GERALD J. MOSSINGHOFF

*Attesting Officer* *Commissioner of Patents and Trademarks*